US011870523B2

(12) United States Patent
Nam et al.

(10) Patent No.: US 11,870,523 B2
(45) Date of Patent: Jan. 9, 2024

(54) METHOD AND APPARATUS FOR INDICATION OF REFERENCE SIGNALS IN WIRELESS SYSTEMS

(71) Applicant: Samsung Electronics Co., Ltd., Suwon-si (KR)

(72) Inventors: Young-Han Nam, Plano, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 17/006,586

(22) Filed: Aug. 28, 2020

(65) Prior Publication Data
US 2020/0395990 A1 Dec. 17, 2020

Related U.S. Application Data

(63) Continuation of application No. 15/921,453, filed on Mar. 14, 2018, now Pat. No. 10,812,162.

(60) Provisional application No. 62/474,418, filed on Mar. 21, 2017.

(51) Int. Cl.
*H04B 7/06* (2006.01)
*H04B 7/0413* (2017.01)
*H04W 72/23* (2023.01)
*H04W 92/10* (2009.01)

(52) U.S. Cl.
CPC ......... *H04B 7/0626* (2013.01); *H04B 7/0413* (2013.01); *H04W 72/23* (2023.01); *H04W 92/10* (2013.01)

(58) Field of Classification Search
CPC . H04B 7/0626; H04B 7/0413; H04W 72/042; H04W 92/10
See application file for complete search history.

(56) References Cited

U.S. PATENT DOCUMENTS

2014/0362720 A1* 12/2014 Kim ...................... H04L 5/0053
370/252
2016/0142189 A1 5/2016 Shin et al.
2016/0192331 A1 6/2016 Liang et al.
2018/0034525 A1 2/2018 Park et al.
(Continued)

FOREIGN PATENT DOCUMENTS

WO 2013109111 A1 7/2013
WO 2016126099 A1 8/2016

OTHER PUBLICATIONS

Indian Patent Office, Examination report dated Feb. 9, 2022 regarding Application No. 201937042574, 7 pages.
(Continued)

*Primary Examiner* — Rhonda L Murphy

(57) ABSTRACT

A method for channel state information (CSI) reporting comprises receiving, by a user equipment (UE) from a base station (BS), a medium access control (MAC) control element (CE) signaling including a quasi co-location (QCL) indication between a first resource and a second resource and activation of the second resource, wherein the UE is configured with the second resource for CSI reporting; and identifying, by the UE from the MAC-CE signaling, the activation of the second resource and a QCL relation between the first resource and the second resource based on the QCL indication.

20 Claims, 12 Drawing Sheets

(56) References Cited

U.S. PATENT DOCUMENTS

2018/0098346 A1 4/2018 Liu et al.
2018/0375560 A1 12/2018 Wei

OTHER PUBLICATIONS

"LTE; Evolved Universal Terrestrial Radio Access (E-UTRA); Physical channels and modulation (3GPP TS 36.211 version 13.0.0 Release 13)", Technical Specification, ETSI TS 136 211 V13.0.0, Jan. 2016, 143 pages.
"LTE; Evolved Universal Terrestrial Radio Access (E-UTRA); Multiplexing and channel coding (3GPP TS 36.212 version 13.0.0 Release 13)", Technical Specification, ETSI TS 136 212 V13.0.0, Jan. 2016, 123 pages.
"LTE; Evolved Universal Terrestrial Radio Access (E-UTRA); Physical layer procedures (3GPP TS 36.213 version 13.0.0 Release 13)", Technical Specification, ETSI TS 136 213 V13.0.0, Jan. 2016, 328 pages.
"LTE; Evolved Universal Terrestrial Radio Access (E-UTRA); Medium Access Control (MAC) protocol specification 3GPP TS 36.321 version 13.0.0 Release 13)", Technical Specification, ETSI TS 136 321 V13.0.0, Jan. 2016, 84 pages.
"LTE; Evolved Universal Terrestrial Radio Access (E-UTRA); Radio Resource Control (RRC); Protocol specification 3GPP TS 36.331 version 13.0.0 Release 13)", Technical Specification, ETSI TS 136 331 V13.0.0, Jan. 2016, 670 pages.
International Search Report dated Jun. 26, 2018 in connection with International Patent Application No. PCT/KR2018/003278.
Written Opinion of the International Searching Authority dated Jun. 26, 2018 in connection with International Patent Application No. PCT/KR2018/003278.
LG Electronics, "Discussion on QCL for NR", 3GPP TSG RAN WG1 Meeting #88, Feb. 13-17, 2017, 3 pages, R1-1702466.
Huawei, Hisilicon, "Details of QCL assumptions and related RS design considerations", 3GPP TSG RAN WG1 Meeting #88, Feb. 13-17, 2017, 5 pages, R1-1701697.
European Patent Office, "Supplementary European Search Report," Application No. EP18771228.6, dated Jan. 29, 2020, 12 pages.
LG Electronics, "Discussion on CSI acquisition framework," R1-1700476, 3GPP TSG RAN WG1 NR Ad-Hoc Meeting, Spokane, USA, Jan. 16-20, 2017, 5 pages.
NTT Docomo, Inc., "RAN WG's progress on NR technology SI in the January ad-hoc meeting," R2-1701059, 3GPP TSG-RAN WG2 #97, Athens, Greece, Feb. 13-17, 2017, 38 pages.
Samsung, "Remaining details on QCL," R1-1720315, 3GPP TSG RAN WG1#91, Reno, USA, Nov. 27-Dec. 1, 2017, 11 pages.
Zte, et al., "Beam related indication for beam management," R1-1701799, 3GPP TSG RAN WG1 Meeting #88, Athens, Greece, Feb. 13-17, 2017, 5 pages.

\* cited by examiner

METHOD AND APPARATUS FOR INDICATION OF REFERENCE SIGNALS IN WIRELESS SYSTEMS

CROSS-REFERENCE TO RELATED APPLICATION AND CLAIM OF PRIORITY

This application is a continuation of U.S. Non-Provisional patent application Ser. No. 15/921,453 filed Mar. 14, 2018, and claims priority to U.S. Provisional Patent Application No. 62/474,418 filed Mar. 21, 2017. The content of the above-identified patent documents is incorporated herein by reference.

TECHNICAL FIELD

The present disclosure relates generally to reference signal in wireless communication systems and, more specifically, to indication method of reference signal in advanced wireless communication systems.

BACKGROUND

In a wireless communication network, a network access and a radio resource management (RRM) are enabled by physical layer synchronization signals and higher (MAC) layer procedures. In particular, a UE attempts to detect the presence of synchronization signals along with at least one cell identification (ID) for initial access. Once the UE is in the network and associated with a serving cell, the UE monitors several neighboring cells by attempting to detect their synchronization signals and/or measuring the associated cell-specific reference signals (RSs). For next generation cellular systems such as third generation partnership-new radio access or interface (3GPP-NR), efficient and unified radio resource acquisition or tracking mechanism which works for various use cases such as enhanced mobile broadband (eMBB), ultra reliable low latency (URLLC), massive machine type communication (mMTC), each corresponding to a different coverage requirement and frequency bands with different propagation losses is desirable. Most likely designed with a different network and radio resource paradigm, seamless and low-latency RRM is also desirable.

SUMMARY

Embodiments of the present disclosure provide an indication of reference signal in a wireless communication system.

In one embodiment, a user equipment (UE) for channel state information (CSI) reporting is provided. The UE comprises a transceiver configured to receive, from a base station (BS), a medium access control (MAC) control element (CE) signaling including a quasi co-location (QCL) indication between a first resource and a second resource and activation of the second resource, wherein the UE is configured with the second resource for CSI reporting. The UE further comprises a processor operably connected to the transceiver, the processor configured to identify, from the MAC-CE signaling, the activation of the second resource and a QCL relation between the first resource and the second resource based on the QCL indication.

In another embodiment, a base station (BS) for configuring channel state information (CSI) reporting is provided. The BS comprises a processor configured to generate a medium access control (MAC) control element (CE) signaling including a quasi co-location (QCL) indication between a first resource and a second resource and activation of the second resource. The BS further comprises a transceiver operably connected to the processor, the transceiver configured to transmit, to a user equipment (UE), the MAC-CE signaling to indicate the activation of the second resource and a QCL relation between the first resource and the second resource.

In yet another embodiment, a method for channel state information (CSI) reporting is provided. The method comprises receiving, by a user equipment (UE) from a base station (BS), a medium access control (MAC) control element (CE) signaling including a quasi co-location (QCL) indication between a first resource and a second resource and activation of the second resource, wherein the UE is configured with the second resource for CSI reporting; and identifying, by the UE from the MAC-CE signaling, the activation of the second resource and a QCL relation between the first resource and the second resource based on the QCL indication.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" and 3GPP TS 36.321 v13.0.0, "E-UTRA, Medium Access Control (MAC) protocol specification;" 3GPP TS 36.331 v13.0.0.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
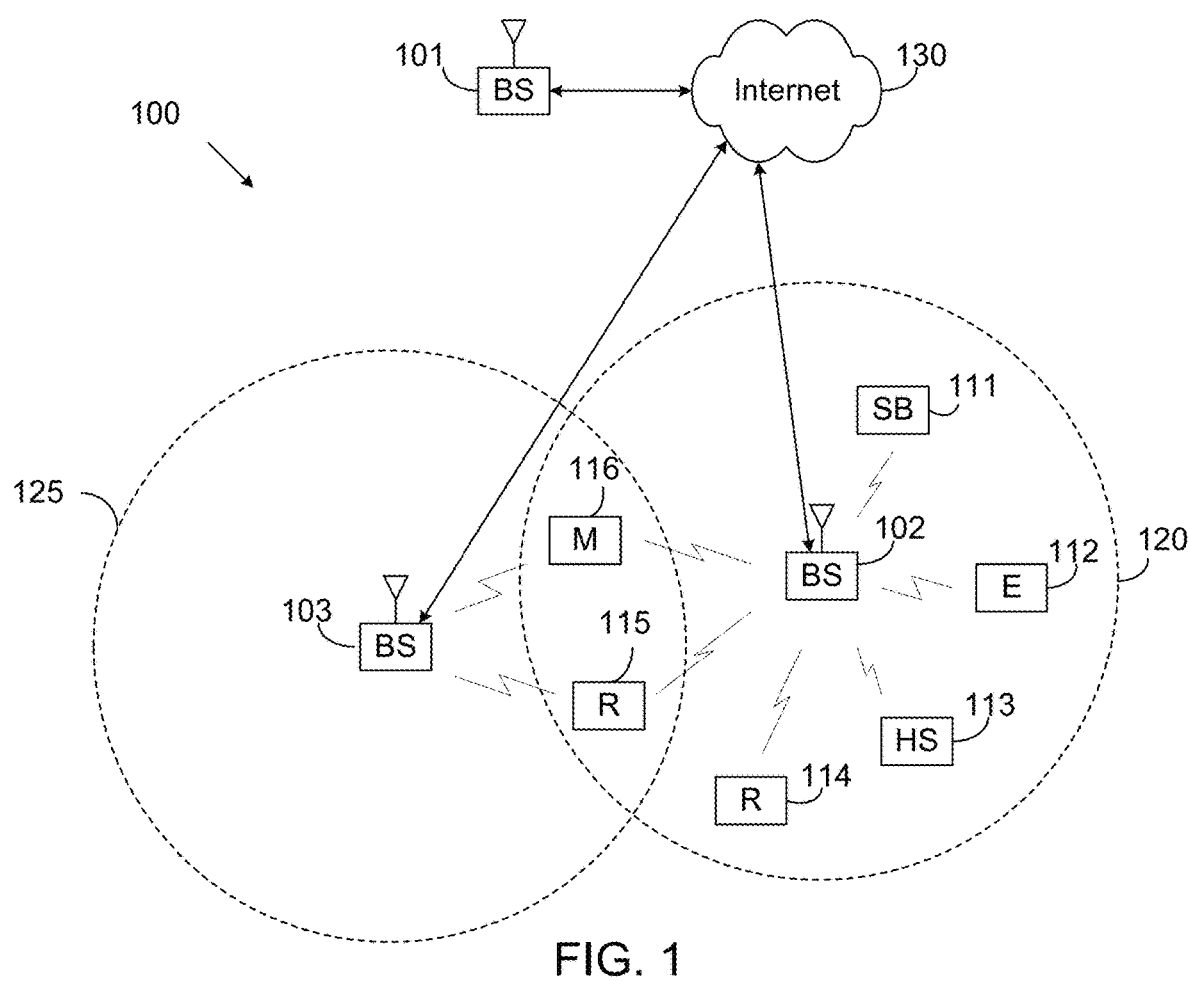
FIG. 1 illustrates an example wireless network according to embodiments of the present disclosure.
Figure 2:
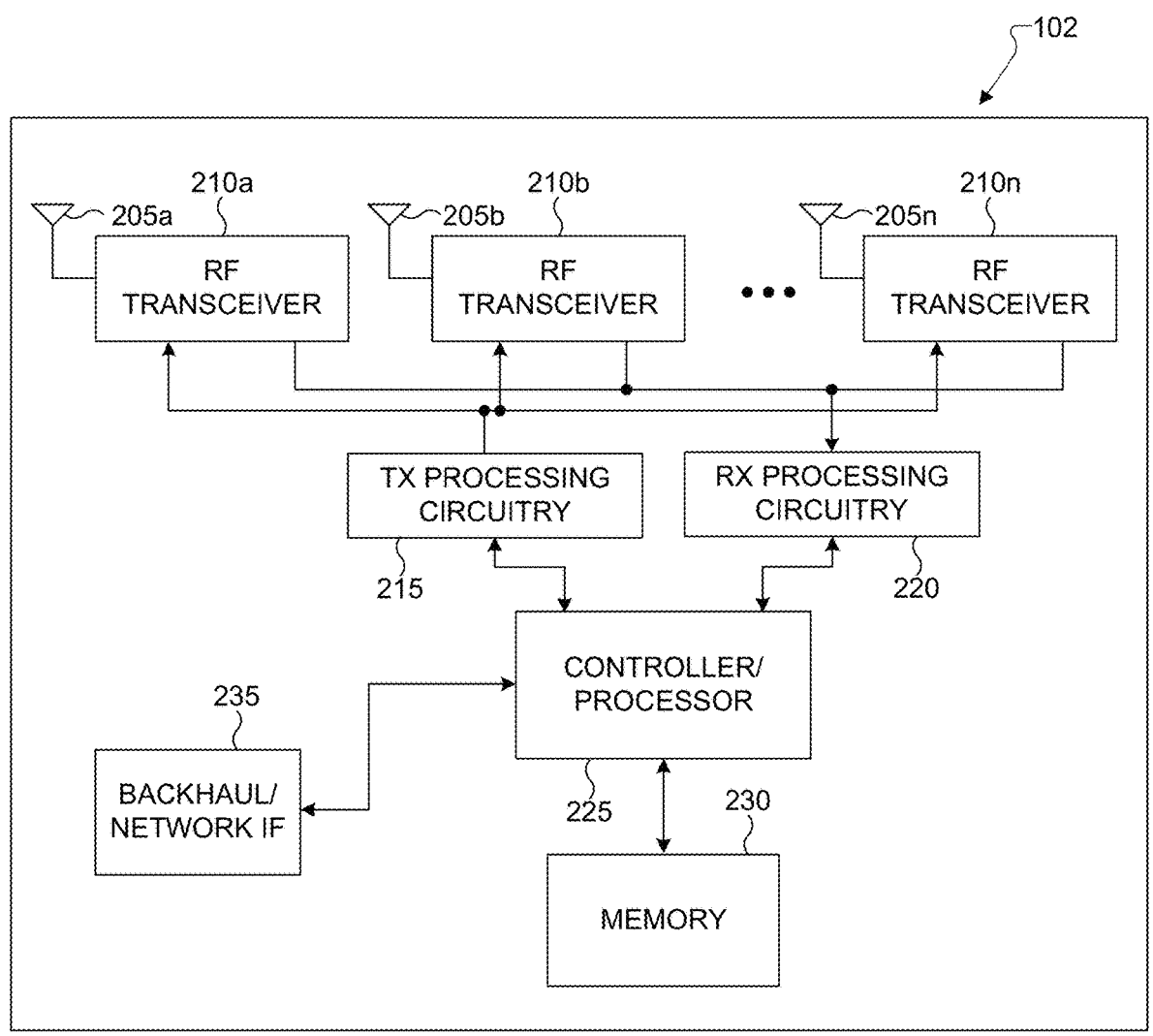
FIG. 2 illustrates an example eNB according to embodiments of the present disclosure.
Figure 3:
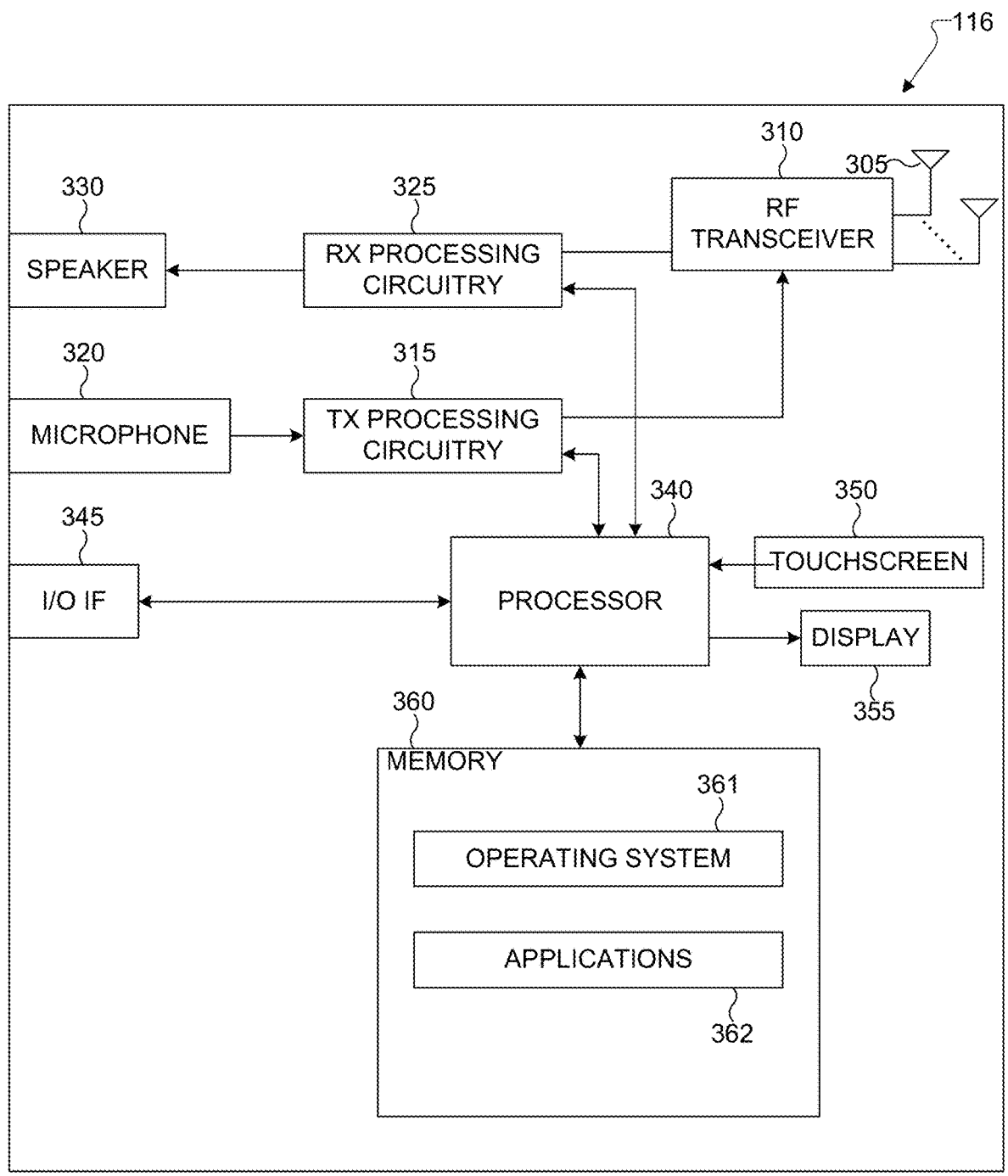
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient covariance matrix feedback in an advanced wireless communication system. In certain embodiments, and one or more of the eNBs 101-103 includes circuitry, programming, or a combination thereof, for receiving efficient covariance matrix feedback in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
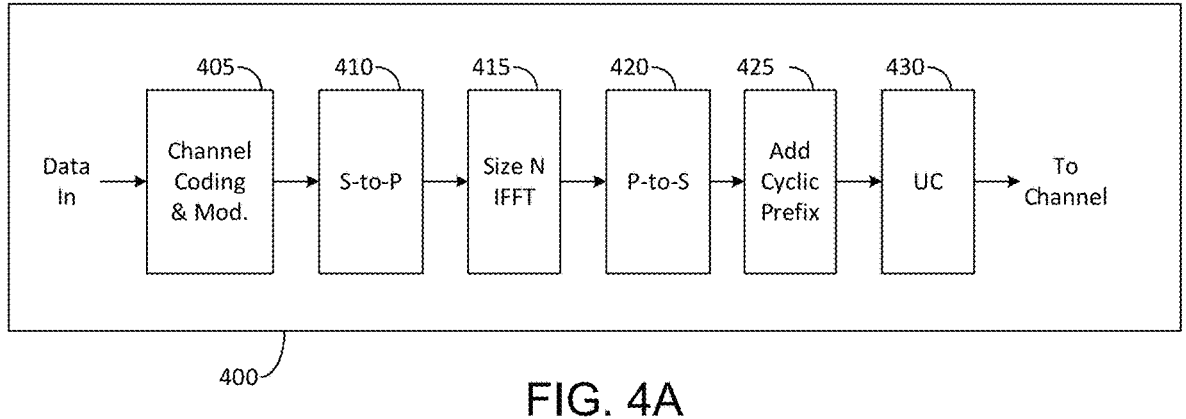
FIG. 4A illustrates a high-level diagram of an orthogonal frequency division multiple access transmit path according to embodiments of the present disclosure.
Figure 4B:
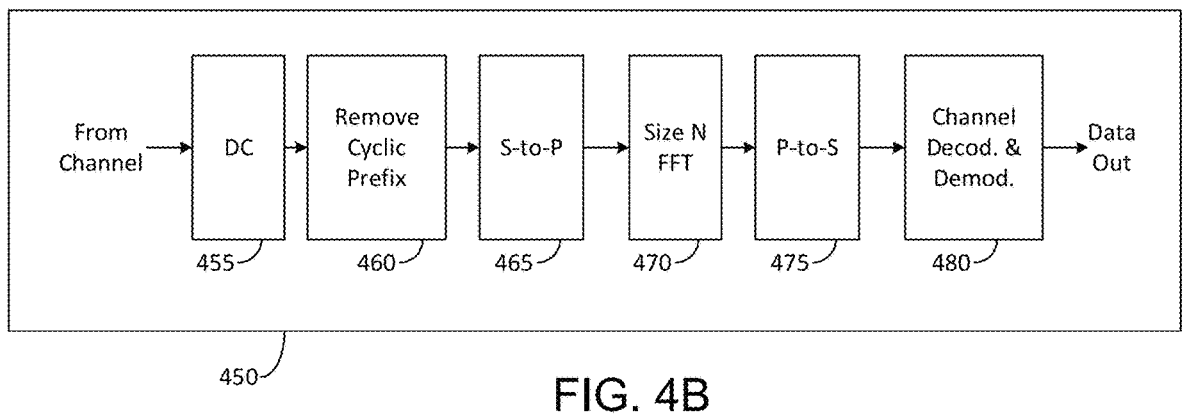
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different Ms that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, it may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
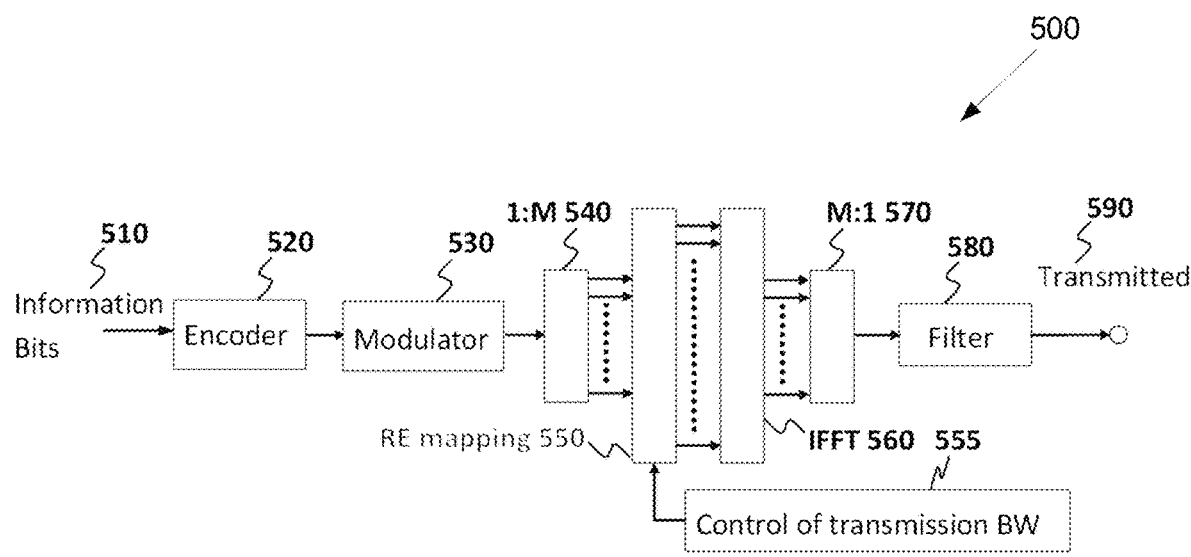
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
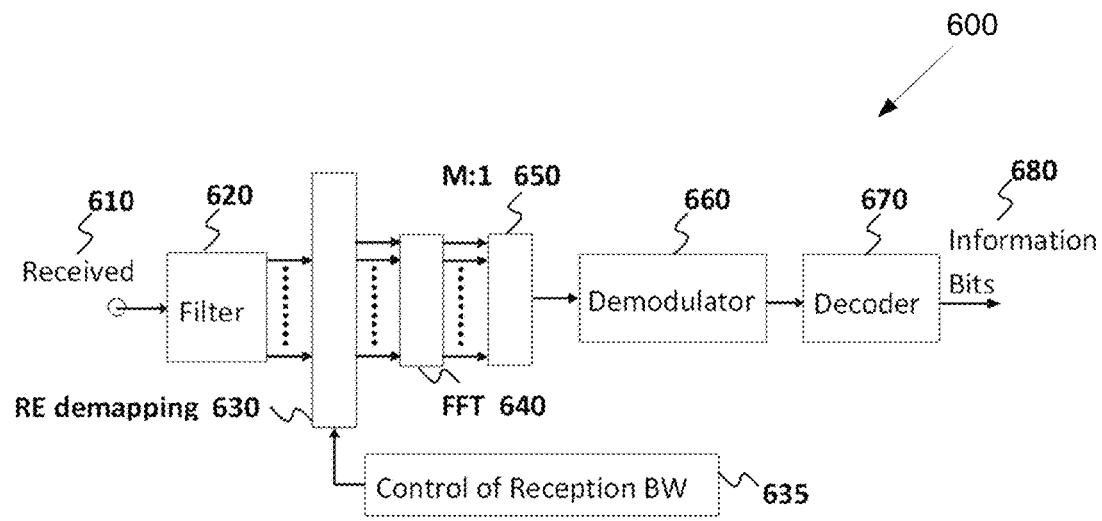
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
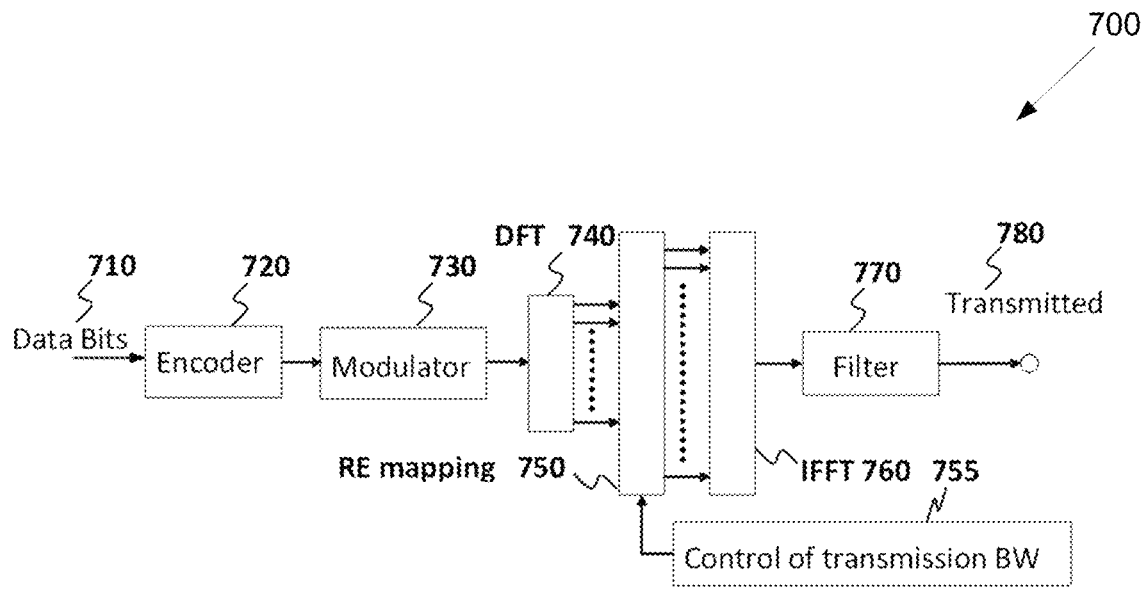
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
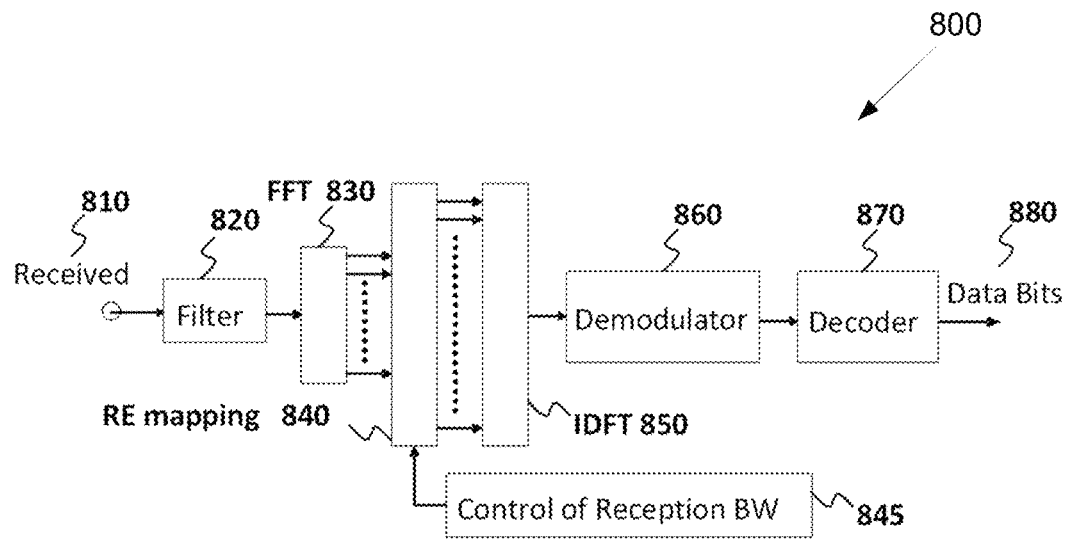
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one method has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Figure 9:
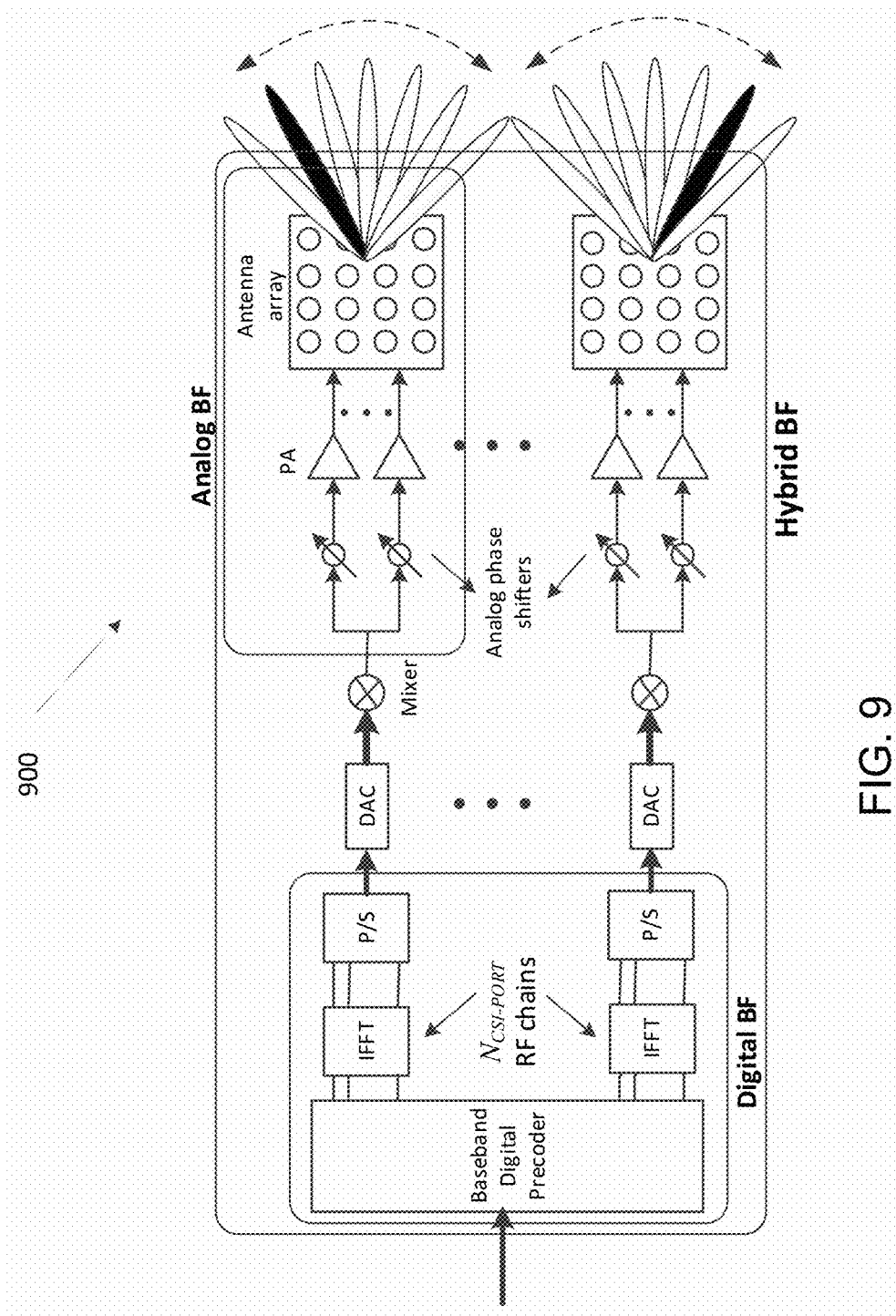
FIG. 9 illustrates an example antenna blocks according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters. One CSI-RS port can then correspond to one sub-array which produces a narrow analog beam through analog beamforming.

This analog beam can be configured to sweep across a wider range of angles by varying the phase shifter bank across symbols or subframes. The number of sub-arrays (equal to the number of RF chains) is the same as the number of CSI-RS ports $N_{CSI-PORT}$. A digital beamforming unit performs a linear combination across $N_{CSI-PORT}$ analog beams to further increase precoding gain. While analog beams are wideband (hence not frequency-selective), digital precoding can be varied across frequency sub-bands or resource blocks.

Before a UE can receive or transmit data to an eNB, the UE first needs to perform a cell search procedure in order to acquire time and frequency synchronization with the eNB. The 4 main synchronization requirements are: symbol, sub-frame, and frame timing; carrier frequency offset (CFO) correction; sampling clock synchronization; and physical cell ID (PCI) detection and potentially some other cell-specific parameters In some embodiments, the following steps are taken during synchronization. In one example of step 1, after power on, a UE tunes its RF and attempts to measure the wideband received signal strength indicator (RSSI) at specific frequencies (channels, as commanded by higher layer) over a set of supported frequency bands one after another, and rank associated cells based on respective RSSI values.

In one example of step 2, the UE uses downlink synchronization channels, that is locally stored primary synchronization signal (PSS) and secondary synchronization signal (SSS) to correlate with a received signal. The UE first finds the PSS, that is located, for example for a FDD system, in a last symbol of a first time slot of a first and a sixth subframes in a frame. This enables the UE to synchronize with the eNB at the subframe level. The PSS detection helps the UE with the slot timing detection and the physical layer cell identity (PCI) detection (0, 1, 2) based on 3 sequences. The 3 sequences are used for PSS to mitigate so-called single frequency network (SFN) effect where a correlation output can exceed a cyclic prefix (CP) length.

In one example of step 3, the SSS symbols are also located in the same subframe as PSS but in the symbol before PSS for a FDD system. From the SSS, the UE is able to obtain the PCI group number (0 to 167). The SSS enables determination of additional parameters such as radio subframe timing determination, CP length determination and whether the eNB uses FDD or TDD. The process is depicted in the LTE cell search procedure shown in FIG. 10.

Figure 10:
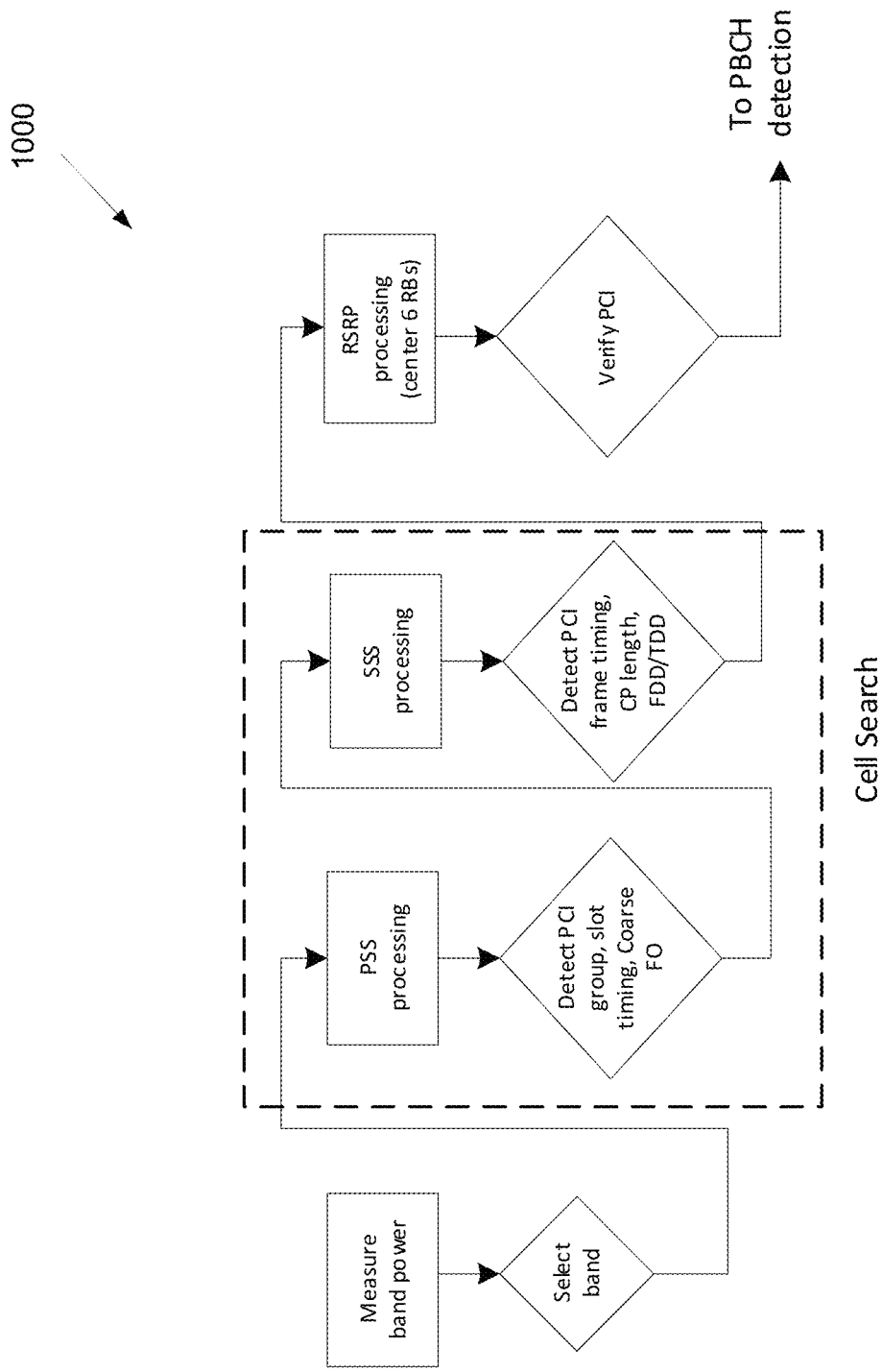
FIG. 10 illustrates an example LTE cell search procedure according to embodiments of the present disclosure.

FIG. 10 illustrates an example LTE cell search procedure 1000 according to embodiments of the present disclosure. The embodiment of the LTE cell search procedure 1000 illustrated in FIG. 10 is for illustration only. FIG. 10 does not limit the scope of this disclosure to any particular implementation.

In one example of step 4, once a UE knows the PCI for a given cell, the UE also knows the location of cell-specific reference signals (CRS) that are used for channel estimation, cell selection/reselection and handover procedures. After channel estimation using CRS, equalization is performed to remove channel impairments from received symbols.

In one example of step 5, in case of initial synchronization, a UE can decode a primary broadcast channel (PBCH) to obtain a master information block (MIB) that carries critical system information such as the DL bandwidth, CRS transmit power, number of eNB transmitter antennas, system frame number (SFN), and a configuration for a physical hybrid-ARQ channel (PHICH).

TABLE 1 shows SSS locations relative to PSS locations for both the TDD-based and FDD-based systems. In case of FDD, PSS is transmitted in the last symbol of a slot to enable the UE to acquire slot timing independent of the CP length. Since a UE does not know a CP length in advance, the UE needs to examine a total of 4 possible SSS locations when the UE is searching for either FDD or TDD cells. Two SSS codes are used which alternate between the $1^{st}$ and $2^{nd}$ SSS transmissions in the sub-frame which enables the UE to determine the radio timing from a single observation of the SSS, which can be beneficial for UEs handing over to LTE from another RAT.

TABLE 1

| | SSS locations | | | | | | | | | |
|---|---|---|---|---|---|---|---|---|---|---|
| Subframe | 0 | 1 | 2 | 3 | 4 | 5 | 6 | 7 | 8 | 9 |
| FDD | PSS (#6) SSS (#5) | | | | | PSS (#6) SSS (#5) | | | | |
| TDD | SSS (#13) | PSS(#2) | | | | SSS (#13) | PSS(#2) | | | |

Figure 11:
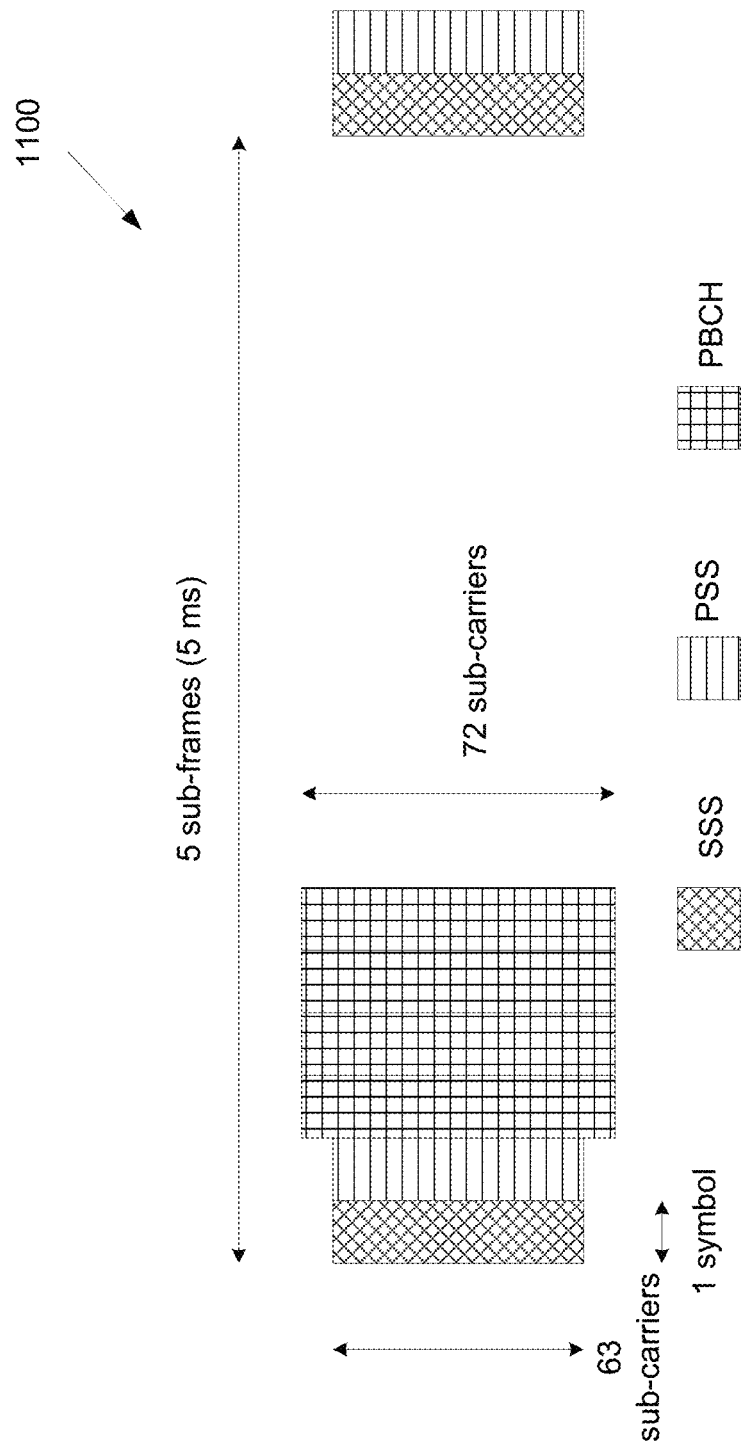
FIG. 11 illustrates an example PSS/SSS/PBCH transmission according to embodiments of the present disclosure.

FIG. 11 illustrates an example PSS/SSS/PBCH transmission 1100 according to embodiments of the present disclosure. The embodiment of the PSS/SSS/PBCH transmission 1100 illustrated in FIG. 11 is for illustration only. FIG. 11 does not limit the scope of this disclosure to any particular implementation.

FIG. 11 illustrates an example frame structure of the PSS/SSS/PBCH transmission in the FDD configuration. The PSS and SSS are transmitted in the central 6 RBs so that even a minimum bandwidth UE can detect the signals. In case of multiple transmit antennas, PSS and SSS are transmitted from the same antenna port in a given sub-frame while they can be switched in between sub-frames for antenna diversity. The PBCH carriers the MIB with just 14 bits that carries some of the most frequently transmitted parameters essential for initial access to the cell, such as the DL system bandwidth, PHICH size, and the SFN number. It is repeated every 40 msec.

The PSS and SSS are transmitted in the central 6 resource blocks (RBs) of a DL system bandwidth so that they can be detected by a UE before the UE determines the DL system bandwidth, assuming that a minimum DL system bandwidth is 6 RBs. The PSS is generated by a Zadoff-Chu (ZC) sequence of length 63 in the frequency domain with the middle element punctured to avoid transmitting on the DC subcarrier.

ZC sequences satisfy a constant amplitude zero autocorrelation (CAZAC) property that enables the PSS to have characteristics of time/frequency flatness (resulting to low PAPR/CM and no dynamic range in frequency domain), good auto/cross-correlation profiles, low complexity detection at a UE (by exploiting complex conjugate property, e.g. u1=29 and u2=63−29=34, and by exploiting central symmetry property in both time and frequency domain), and so on. However, due to the duality of the CAZAC property in the time and frequency domains, a shift of a ZC sequence in the frequency domain is also translated in time domain, and the reverse.

Therefore, in the context of timing synchronization using ZC sequences, a frequency/time offset displays the time/frequency offset, respectively, and the offset in these two dimensions cannot be distinguished. The central root indices in the available root ZC sequence index vector have less frequency offset sensitivity and, for this reason, the root indices u=25, 29 and 34 were selected in LTE to provide three cell IDs within a cell ID group.

The selection of the root indices also considered partial correlation to overcome large frequency offset in initial cell search. Due to the phase rotation in time domain as a result of a large frequency offset, partial correlations need to be considered not only for ZC sequences but also for other sequences under large frequency offset operation especially in initial cell search although a window size for each partial correlation can be different depending on the exact design.

A PSS sequence x(n) is composed of a length $N_{ZC}$ root $u_i$ ZC sequence and is given by:

$$x(n) = e^{-\frac{j\pi u_i n(n+1)}{N_{ZC}}}, n = 0, 1, \ldots, N_{ZC}-1.$$

The LTE ZC sequence is mapped to achieve the central symmetry property (i.e. index 5 corresponds to the DC sub-carried for a RB that includes 12 sub-carriers indexed from 0 to 11). The SSS sequences are based on M-sequences. 168 sequences are generated by frequency domain interleaving of two length-31 BPSK-modulated M-sequences, where the two length-31 M-sequences are derived from two different cyclic shifts of a single length-31 M-sequence. The two part structure of the SSS leads to side-lobes during cross-correlation and scrambling is used to mitigate the side lobes. For SSS, coherent detection is possible when channel estimates can be obtained via PSS detection.

In order to achieve a better performance of coherent detection for SSS by estimating the channel from PSS, multiple PSS sequences are used with a trade-off in PSS detection complexity. The different PSS sequences can enable improved channel estimation accuracy by relaxing the SFN effect that exists due to having a single PSS sequence from all cells. Thus, the aforementioned PSS/SSS design can support both coherent and non-coherent SSS detection.

A UE needs to operate three parallel correlators for three different PSS sequences. However, the root indices 29 and 34 are a complex conjugate to each other and this enables a 'one-shot' correlator—two correlation outputs for u=29 and 34 can be obtained from correlation with either u=34 or u=29. The conjugate property holds in both time and frequency domains, for any sampling rate, with the central symmetry mapping in frequency domain. Therefore, only two parallel correlators are needed (one for u=25 and the other for u=29 (or u=34)).

There is a need to enhance the existing synchronization and cell search procedure for new communication systems such as 5G at least for the following reasons. In one example for beamforming support, in order to meet link budget requirements for operation in high carrier frequency bands, such as ones above 6 GHz, beamforming is required for transmissions by an eNB (and possibly also by a UE). Therefore, the aforementioned synchronization and cell search procedure needs to be updated for beamforming support.

In another example for large bandwidth support, for operation with large system bandwidths, such as 100 MHz or above, a different sub-carrier spacing than the one for operation in the smaller system bandwidths can apply and such design needs to be considered for the synchronization and cell search procedure design.

In another example for improved coverage, for some applications, such as ones associated with a requirement for increased coverage that can occur due to placements of UEs in locations experiencing a large path loss, the synchronization and cell search procedure needs to support enhanced coverage and increased repetitions of synchronization signals.

In yet another example for improved performance, the synchronization performance of the aforementioned procedure is limited due to false alarms caused by the partitioning a cell ID into 1 PSS and 2 SSS, thereby leading to invalid combinations of PSS/SSS that cannot completely resolved by scrambling. A new synchronization procedure can be designed with improved false alarm performance.

In yet another example for supporting variable transmit time interval (TTI), in the LTE specification, the TTI duration is fixed. However, for 5G systems, the TTI is expected to be variable due to support for different sub-carrier spacing, low latency considerations etc. In this scenario with variable TTI, the mapping of the synchronization sequences and cell search within the frame needs to be specified.

In the present disclosure, an SS burst set is periodically recurring with period P, where P is an integer, e.g., 5, 10, 20, 40, 80, 100 etc. in terms of millisecond.

In the present disclosure, an SS burst means a set of consecutive $N_2$ SS blocks, where $N_2$ is an integer, e.g., 1, 2, 3, 4.

In the present disclosure, an SS block comprises a combination of synchronization signals, broadcast signals, and reference signals, which are multiplexed in TDM, FDM, CDM or hybrid manner.

In the present disclosure, a cell coverage is provided by a beam sweeping manner over SS blocks comprising an SS burst set. Different Tx beams may be used for different SS blocks within an SS burst set.

Figure 12:
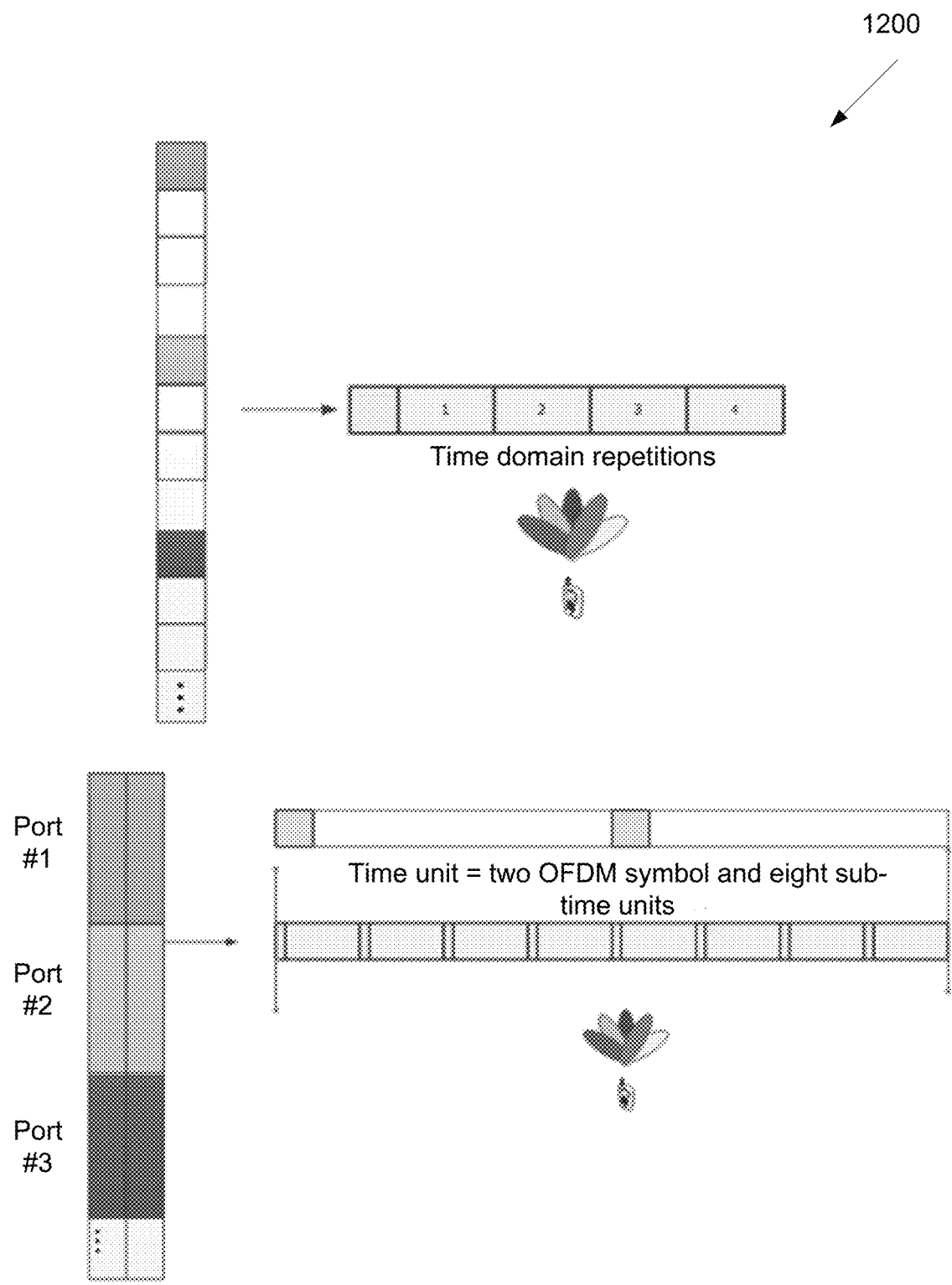
FIG. 12 illustrates examples IFDMA and subcarrier spacing according to embodiments of the present disclosure.

FIG. 12 illustrates examples IFDMA and subcarrier spacing 1200 according to embodiments of the present disclosure. The embodiment of the IFDMA and subcarrier spacing 1200 illustrated in FIG. 12 is for illustration only. FIG. 12 does not limit the scope of this disclosure to any particular implementation.

As shown in FIG. 12, IFDMA scheme and subcarrier spacing scaling scheme are considered, When IFDMA is used, the length of the individual sub-time unit is approximately $1/Q_1$-th of a time unit, wherein integer $Q_1$ refers to the repetition factor (every $Q_1$-the subcarrier carries signal). When subcarrier scaling is used, the length of the individual sub-time unit is $1/Q_1$-th of a time unit, wherein $Q_1$ refers to the subcarrier scaling factor (subcarrier spacing is $Q_1$ times larger than the reference subcarrier scaling).

In the present disclosure, a QCL resource may refer to a beam, an antenna port (across all the configured time units), a group of antenna ports corresponding to an RS resource, a CSI-RS resource, or a combination of an antenna port and a time unit of an RS resource.

In the present disclosure, an RS resource may refer to a CSI-RS resource, BRS (multi-beam mobility RS, can be cell-specifically configured, may correspond to PSS, SSS, PBCH DMRS, DMRS, CSI-RS or a newly designed RS), a set of DMRS ports, etc.

In the present disclosure, an RS setting may refer to a set of RS resources.

In the present disclosure, a time unit may correspond to a block of (consecutive) one or more OFDM symbols according to a configured numerology, on which a UE can assume that a same QCL parameter is applicable to each antenna port (and/or in which the port-coherency holds).

In the present disclosure, a Tx beam (ID) may refer to a QCL resource of an RS resource, wherein the RS resource can be BRS or CSI-RS. Tx beams of an RS resource or an RS setting can be indexed with unique IDs, referred to Tx beam IDs. For example, if N Tx beams are available in an RS resource or an RS setting, N unique IDs can be allocated to these N individual Tx beams.

In the present disclosure, an Rx beam ID refers to an index that can be commonly understood by a UE and gNB, for UE's Rx beamforming operation. A UE can be equipped with a single or multiple digital Rx chains. When the UE is equipped with a single Rx chain, a first Rx beam ID corresponds to a first Rx beam that is steered to a first angle; a second Rx beam ID corresponds to a second Rx beam that is steered to a second angle; and so on. When the UE is equipped with N digital Rx chains, the first Rx beam ID corresponds to a first set of N Rx beams that are steered to a first set of N angles; the second Rx beam ID corresponds to a second set of N Rx beams that are steered to a second set of N angles; and so on. Here, N is a positive integer. As an Rx beam ID may be associated with multiple Rx beams (especially in multiple digital chain case), an Rx beam ID may alternatively referred to an Rx mode.

In the present disclosure, Rx-beam, Rx mode, Rx beam set and Rx-beam related QCL parameters are used interchangeably, and refer to average AOA, ASD or antenna correlations. When an Rx beam of a first QCL resource can be inferred by that of a second QCL resource, the first and the second QCL resources are said QCL'ed in Rx-beam/Rx mode.

In the present disclosure, a set of QCL parameters refers to a combination of Rx-beam related parameters (average angle of arrival, arrival angle spread, Rx antenna correlation, etc.), delay and timing related parameters (Rx timing, delay spread, average delay), Doppler related parameters (average Doppler, Doppler spread), etc.

In 3GPP NR standards, the following resource units are defined for configuring a resource setting: ports ∈ A resource; resources ∈ A resource set; resource sets ∈ A resource setting; and resource settings ∈ A set of resource settings In the present disclosure, a slot and subframe are used interchangeably.

In some embodiments, the use cases of the $1^{st}$ set of resource settings (or may be alternatively referred to as $1^{st}$ level CSI-RS) are for intra-cell & inter-cell beam management (BM) and potentially for mobility.

Multiple such resource settings can be configured to a UE, one setting per serving cell. A first setting for intra-cell BM may be cell-specifically configured or pre-configured. Alternatively, the first setting may also be UE-specifically configured. The first setting may be referred to "the serving setting," and it corresponds to the serving cell's CSI-RS, for which a subset of parameters can be obtained by the physical cell ID and SS block mapping of the serving cell. For the serving setting, a basic configuration (e.g., periodicity and subframe offset, number of ports, etc.) is provided in MIB or remaining minimum system information (RMSI) or pre-configured, and an additional configuration may be provided later (e.g., if PBCH gives basic configuration, RMSI/SIB may give additional configuration), e.g., how to partition the resources in the setting into sets.

The other settings (for neighboring cells) are all UE-specifically configured (but they may still be cell-specifically transmitted).

For the UE-specific configurations of a resource setting, at least the following parameters are provided: PCID to indicate the association between the CSI-RS settings and corresponding SS blocks; and VCID for CSI-RS scrambling, which can be different from PCID.

For this type of resource setting, the following relation may hold between the setting and SS blocks. In one example, one-to-one mapping between SS blocks with a configured/detected PCID and CSI-RS resources (or CSI-RS sets) in a setting may be considered. In such example, an i-th SS block is QCL'ed with an i-th CSI-RS resource (or a CSI-RS set) in a subset of QCL parameters. In such example, CSI-RS time locations may be self-discoverable wrt. the SS block time locations. In such example, the number of actual CSI-RS time locations may be the same as the number of actually transmitted SS blocks. In such example, a UE can perform rate matching according to the actual CSI-RS time locations.

In one embodiment, for resource management, indication and reporting, a unit resource is defined. In such embodiment, the indication and reporting, the unit resource can be one of: (resource, port), or (resource), or (set, resource, port), or (set, resource). In such embodiment, a unique ID is allocated per unit resource. In such embodiment, a total number of unit resources in a setting is up to [128].

The unit resources in each resource setting corresponding to the $1^{st}$ set may be semi-dynamically activated and/or deactivated via MAC. At least for the serving setting, the activation/deactivation MAC signaling is supported. The activation/deactivation MAC signaling is provided separately for the different settings.

With regards to the serving setting, all the sets (resources) corresponding to the actually transmitted SS blocks are activated. If the setting is configured by RRC, initially activated sets (resources) may also be indicated by the RRC configuration. After the setting is configured (either by RRC or broadcast signaling), the activated sets may be updated by UE-specific MAC signaling.

In some embodiments, for a serving cell, a UE may be configured with "a serving resource setting." The unit resources in the serving resource setting can serve as reference unit resources.

In some embodiments, an identity of a reference unit resource may be indicated to associate it with a unit resource in another resource setting. The indication signaling may be used for a UE to make QCL relation between the two unit resources.

In some embodiments, when the serving setting is configured cell-specifically, a UE may assume that all the unit resources corresponding to the activated SS blocks are activated initially. On the other hand, when the serving setting is configured UE-specifically, a UE is also be initially indicated with activated unit resources in the serving setting.

In some embodiments, the activated set of unit resources of each resource setting can be updated in MAC signaling.

In some embodiments, $2^{nd}$ set of resource settings ($2^{nd}$ level CSI-RS) is considered. The use cases for the $2^{nd}$ set of resource settings are for Tx/Rx beam refinement for UE-specific beam managements.

Configuration examples for the $2^{nd}$ set of resource settings are provided below, with possible grouping of resources for TP-level QCL in a first set of QCL parameters. The $2^{nd}$ set of resource settings may correspond to the following examples. In one example for a few resource settings, one setting per TP, a QCL indication may be provided between a resource setting in the second set and a unit resource (the unit resource is not necessarily a resource setting) in the first set.

In another example for a resource setting with a few sets, one set (a group of resources) per TP, a QCL indication may be provided between a set in the second set and a unit resource (the unit resource is not necessarily a resource setting) in the first set.

In yet another example for a resource setting with a number of resources, one resource per TP, a QCL indication may be provided between a resource or (a resource, a port) in the second set and a unit resource (the unit resource is not necessarily a resource setting) in the first set.

The first set of the QCL parameters may include a spatial parameter related to the Rx beam.

In some embodiments, the CSI-RS for beam refinement or CSI reporting can be configured via at least one of the following methods: (1) one setting per TP; (2) one set per TP; and (3) one resource per TP. In the respective methods, a UE may assume that all the antenna ports in each unit resource corresponding to TP are QCL'ed with each other in a first set of QCL parameters.

In some embodiments, indication of a unit resource in a reference resource setting for CSI/BSI measurement and/or reporting relying on a second resource setting is considered.

In the present disclosure, the $1^{st}$ set may be replaced with SS blocks. A UE may get indicated a unit resource in a "reference resource setting" for CSI measurement/reporting relying on unit resources in a second resource setting. The indicated unit resource in the reference resource setting may be used for making a QCL relation with the unit resources in the second resource setting in a first subset of QCL parameters. The indication may facilitate UE to select a set of Rx beams that can be used for the possible Rx beam sweeping relying on the second resource setting. The reference resource setting may be the serving resource setting. Alternatively, it can be a resource setting in the first set. Alternatively, it can be a set of actually-transmitted SS blocks; in this case, a unit resource corresponds to an SS block.

The signaling methods for this indication can be semi-dynamic (MAC signaling) or dynamic (in aperiodic CSI/BSI trigger in a UL related DCI). The unit resource in the reference setting may be selected from an activated subset for the signaling and reporting purpose, in which case, the number of bits to indicate a unit resource from the reference setting is determined corresponding to the number of unit resources of the activated subset, say n. Then, the number of bits to indicate a unit resource may be determined to be $\log_2(n)$.

In some embodiments, for each resource setting used for CSI/BSI reporting, an identity of reference resource setting may be indicated. The reference unit resources for a resource setting, e.g., for QCL indication, is selected from the indicated reference resource setting. In one example, the reference resource setting for CSI/BSI reporting for a non-serving resource setting is by default, the serving resource setting. In another example, the reference resource setting for CSI/BSI reporting for the serving resource setting is by default, the actually transmitted set of SS blocks. In yet another example, the reference resource setting for a resource setting can be updated.

In some embodiments for CSI/BSI reporting, aperiodic CSI reporting may be considered to indicate which of CSI/BSI to report in the scheduled PUSCH. In one example, an aperiodic CSI/BSI trigger explicitly indicates (e.g., by one bit field) whether to report CSI or BSI. In one example, an aperiodic CSI/BSI trigger indicates which measurement/reporting settings to use for the measurement and reporting. In such a case, the measurement/reporting setting includes the BSI/CSI state.

Example information conveyed for an aperiodic CSI/BSI reporting in a subframe/slot includes the following. In one instance, the aperiodic CSI/BSI reporting includes whether to report CSI or BSI. In one instance, a measurement/reporting setting to be used for the current aperiodic report, which may include at least one of the following information: measurement/reporting type (e.g., CSI or BSI); a set of resource settings to be used for the measurement (e.g., the set of resource setting may be included in the measurement/reporting setting); a subset of unit resources (e.g., CSI-RS resources) in the selected set of resource settings to be used for the measurement; and partial information on the CSI/BSI reporting payload size . . . maximum number of bits to be reported in the current report, determined by the activated subset.

In one instance, the measurement/reporting setting includes unit resources in the resource setting to be used for measurement and reporting, wherein the unit resources are selected from the activated subset, and the number of the unit resources to be used for measurement and reporting can be equal to or smaller than the number of unit resources in the activated subset. The payload size of the current report is determined by the selected unit resources in the selected measurement/reporting setting.

In one instance, the measurement/reporting setting includes a unit resource ID of the reference resource setting, which can be the serving resource setting, or a resource setting in a first set, or an actually transmitted set of SS blocks. A UE may assume QCL relation between the unit resource indicated by the unit resource ID and a unit resource in the $2^{nd}$ set of resource settings in a first set of QCL parameters. In one such instance, if the measurement/reporting setting to be used for the current report is in the $2^{nd}$ set, the unit resource ID of the reference resource setting corresponds to a unit resource ID in the serving setting; if the measurement/reporting setting is in the $1^{st}$ set (e.g., serving setting), the unit resource ID corresponds to an SS block index. In one such instance, an information related to the reference resource setting (e.g., an ID) is explicitly indicated in the UL related DCI.

In some embodiments, a UE can be dynamically triggered to report either BSI or CSI by a common field of UL related DCI. In one example, the dynamic signaling includes a bit field to indicate whether to report BSI or CSI; in another method, the measurement/reporting setting includes reporting type of BSI or CSI, and the dynamic signaling indicates an ID of measurement/reporting setting.

In some embodiments, information on the number and identity of unit resources (e.g., CSI-RS resource(s) or CSI-RS resource set(s)) in selected resource settings that are to be used for the current measurement/reporting for aperiodic CSI/BSI reporting may also be provided by dynamic signaling. This signaling, may also determine the payload size for the reporting.

In some embodiments, information on the reference unit resources that are paired with the unit resources in a resource setting for measurement/reporting triggered by the UL related DCI, e.g., for QCL purpose, may also be provided by dynamic signaling (e.g., aperiodic CSI/BSI trigger related information).

In some embodiments, updated configurations for the serving resource setting in RRC connected mode is considered. When a UE is in CONNECTED mode, the UE can be provided with further information regarding the cell-wide CSI-RS (which may also be referred to as the serving resource setting), or in a DCI in PHY. The cell-wide CSI-RS can be used for beam management for the purpose of the initial beam alignment and beam switching. The additional information comprises one or more of the following.

The additional information may comprise an updated CSI-RS periodicity. This information helps UE to measure CSI/BSI more accurately (if the updated periodicity is shorter than the cell-specific one), or to measure CSI/BSI with less UE power consumption (if the updated periodicity is longer than the cell-specific one). This can be conveyed in RRC signaling.

The additional information may comprise information on a subset of CSI-RS resources for UE to measure. This information helps to reduce the burden of UE measurement when the full set of cell-specific CSI-RS resources is large. The subset is selected from the set of K CSI-RS resources. The subset signaling can be done in bitmap, wherein each bit state of b=1 at position p indicates that CSI-RS resource p is configured for a UE to measure; b=0 indicates that UE is configured not to measure CSI-RS resource p. A UE needs to measure the beam RSRPs on the subset of the CSI-RS resources, and report a subset of selected RSRPs among the beam RSRPs. This can be conveyed in MAC signaling.

The additional information may comprise an information on a subset of CSI-RS ports for a UE to measure. The purpose of indicating this information is similar to that of the information on a subset of CSI-RS resources. When configured with a subset of CSI-RS ports, the UE needs to measure beam RSRPs only on the configured antenna ports across all the K resources, and report a subset of selected RSRPs among the beam RSRPs. This can be conveyed in MAC signaling.

In some embodiments, updated configurations for the beam refinement CSI-RS in RRC connected mode is considered.

Suppose that the UE is configured with a first set of CSI-RS resources (1$^{st}$ set of settings, or the serving resource setting) and a second set of CSI-RS resources (2$^{nd}$ set of settings). The first set of CSI-RS resources is configured for a UE to measure beam-specific RSRPs in the whole cell, and hence the number of beams to measure is relatively large, and a coarse or wide beam is used for the beam construction. The second set of CSI-RS resources is configured for a UE to measure beam-specific RSRPs so that the beam refinement can be performed.

For the first set of CSI-RS resources, a UE is allowed to make measurement across multiple time slots to derive beam-specific RSRPs (i.e., no measurement restriction is applied in time domain), and the measurement quantity, e.g., RSRPs/RSRQs can correspond to a time-averaged value.

On the other hand, for the second set of CSI-RS resources, a UE may make measurement per time slot to derive beam-specific RSRPs. In this case measurement restriction is applied, and the unit of measurement is one time slot.

For initial RRC configuration of a resource setting, a unit resource in a reference resource setting may be indicated per unit resource in the resource setting, e.g., so that a UE can make QCL relation between the unit resources in the different resource settings in a first set of QCL parameters. Here, the unit resource in the reference resource setting (denoted as reference unit resources afterwards) and the configured resource setting may or may not have the same resource granularity. Here, the first set of QCL parameters comprises one or more of Rx beam related spatial parameters, gain, delay and Doppler.

In one example, a UE is configured with two sets of CSI-RS. A first set (e.g., resources 0-99 and a number of resources $N_1$=100) corresponds to the serving resource setting, or an RRC configured resource setting. A second set (e.g., resources 0-2 and a number of resources $N_2$=3) corresponds to a separately RRC configured resource setting.

When the second set is configured by RRC, the UE is further indicated with the unit resource IDs of the first set, so that UE may assume that each unit resource of the second set is QCL in the first set of parameters with the indicated reference unit resource (the reference resource corresponds to the first set).

In one example, for resource 0 for the second set, an RRC configuration is determined according to the information entities: unit resource x in the reference resource (for QCL); and/or RE mapping pattern, number of antenna ports, periodicity, offset, power control, sub-time unit composition, etc. For resource 1 for the second set, an RRC configuration is determined according to the information entities: unit resource y in the reference resource (for QCL); and/or RE mapping pattern, number of antenna ports, periodicity, offset, power control, sub-time unit composition, etc. For resource 2 for the second set, an RRC configuration is determined according to the information entities: unit resource z in the reference resource (for QCL); and/or RE mapping pattern, number of antenna ports, periodicity, offset, power control, sub-time unit composition, etc.

In another example, an RRC configuration (resource 0) for the second set is determined according to unit resource x in the reference resource (for QCL). An RRC configuration (resource 1) for the second set is determined according to unit resource y in the reference resource (for QCL). In one example, an RRC configuration (resource 2) for the second set is determined according to: unit resource z in the reference resource (for QCL). A single set of values that are commonly applicable for the all the resources are provided, for an RE mapping pattern, number of antenna ports, periodicity, an offset, a power control, a sub-time unit composition, etc. In one such example, the RE mapping pattern for resource 0 may be determined according to the configured RE mapping parameter. The RE mapping patterns for resources 1 and 2 may be determined by applying a time or frequency offset to the RE mapping pattern for resource 0. For example, for resource 1, one time unit shift is applied to the RE mapping pattern of resource 0; and for resource two, two time unit shift is applied to the RE mapping pattern of resource 0. The other parameters, i.e., a number of antenna ports, periodicity, an offset, power control, a sub-time unit composition, etc., may be commonly configured for all the three resources. Sub-time unit composition may correspond to the number of sub-time units comprising a time unit.

The aforementioned examples illustrate a case where three resources are configured for the second set. In general, the number of resources that can be configured to the second set can be an integer number, e.g., 1, 2, 3, . . . ; the aforementioned embodiment may be applicable to any integer number of such resources.

As a UE moves around (maybe to a vicinity of different TRPs or to different TRP beams), based on the measurement/reporting results on the first set, the network may decide to update a subset of configuration parameters, e.g., the reference unit resources for the second set. The updated reference unit resources may be indicated via DCI or MAC CE signaling, so as to reduce the signaling overhead and delay as compared to the RRC signaling. The update signaling is lighter than the initial RRC signaling in that it only updates a subset of parameters; the other configurations are not updated and maintained to be the same.

The update command may include individual activation and deactivation of the CSI-RS resources in the second set.

In some embodiments, the update command may include the following information: a selected unit resource index (indices) in the second set; and/or a reference unit resource index (or indices) to map to the unit resources in the second set (e.g., for QCL).

In one example, from the update command, the UE is instructed to update the reference unit resource of a single resource in set 2, say resource 1, to be reference unit resource w from reference unit resource x. In other words, the reference unit resource of resource 1 is updated from x to w.

Alternatively, the update command may include information of updated parameters for all the activated resources in the second set. If activated resources are indicated in another signaling (e.g., MAC CE signaling), only the updated reference unit resource indices are signaled, which are paired sequentially with the activated unit resources in the second set. For example, when unit resources 0, 1, 2 are activated in the second set, from the update command, the UE is instructed to update the QCL resources.

In one example of updated configuration for the second set, for unit resource 0, resource a in the first set (for QCL) is configured; for unit resource 1, resource b in the first set; and for unit resource 2, resource c in the first set. The update command contains three numbers {a, b, c} to indicate the resource indices of the first set.

In an alternative embodiment, a reference unit resource may correspond to an SS block.

In some embodiments for aperiodic CSI/BSI triggering and parameter update, the update command can be conveyed in PHY, via aperiodic CSI trigger. An aperiodic CSI trigger field in a UL related DCI may inform a UE to measure and report CSI/BSI on A NZP CSI-RS resources in the second set, and information on the reference unit resources selected from the first CSI-RS set (or the SS blocks) for the A NZP CSI-RS resources are also provided in the same DCI. The CSI-RS resources in this embodiment may be replaced with unit resources.

In one embodiment, the states of the aperiodic CSI trigger field indicate the number of the NZP CSI-RS resources to be used for the measurement and reporting. When a number n is indicated, the UE is configured to use NZP CSI-RS resources 0, 1, . . . , n−1 for the measurement and reporting, wherein n is a positive integer.

In another embodiment, the states of the aperiodic CSI trigger field indicate the identity of the NZP CSI-RS resources to be used for the measurement and reporting. The identity can be indicated by a bitmap. When bit i is set, it implies that the NZP CSI-RS resource i needs to be used for the measurement and reporting, wherein i=0, 1, . . . , $N_2-1$. The identities of the A CSI-RS resources in the first set (a reference setting) that are QCL'ed in a subset of QCL parameters with the A CSI-RS resources in the second set to be used for the current aperiodic reporting may also be indicated in the same UL related DCI.

In yet another embodiment, the number of bits for the indication of the identities of CSI-RS resources in the first set is proportional to A, i.e., the number of CSI-RS resources that are used for the measurement and reporting. For example, if 7 bits are used for each CSI-RS resource in the second set, if A=3, 21 bits are used for indicating the three CSI-RS resources in set A that are QCL'ed with the CSI-RS resources in set B.

In some embodiments, two step indication (e.g., MAC and PHY) is considered, for reducing number of bits for the QCL indication, MAC CE and PHY signaling may jointly be used.

The MAC CE signaling is used for indicating an active subset of the first set of $N_1$ CSI-RS resources, to reduce the number of CSI-RS resources that needs to be indicated in the DCI. The number of CSI-RS resources in the active subset, say $N_3$, can be pre-configured in the spec so that the bit payload per CSI-RS resource for the DCI indication can be static. Alternatively, the number (and identities) of CSI-RS resources in the active subset can also be configured in the RRC/MAC signaling, in which case more flexibility can be achieved at the expense of variable bit payloads. Typically $N_3<N_1$, so that the DCI payloads for the QCL indication can be reduced. In the UL related DCI to trigger an aperiodic CSI/BSI reporting, the unit resources in the reference resource setting are indicated for the unit resources to be measured, with $\log_2(N_3)$ bits per reference unit resource.

Individual indication of a combination of a large number of the first-set CSI-RS resources in the MAC requires heavy signaling. For example, if a bitmap is used to indicate a combination of $N_1$=100 CSI-RS resources, the MAC signaling needs to be able to take care of 100 bit indication, which seems to be too large to be reliably transported in a single transmission. Hence, some optimization of the indication for MAC signaling may be necessary.

In one example, the activated resources are indicated by two numbers: (1) a resource offset $n_1$, and (2) a number of resources, $N_3$. When these two numbers are indicated, the activated resources are: $n_1$, $n_1+1$, . . . , $n_1+N_3-1$. The candidate values to be indicated for the resource offset and the number of resources may also be a subset of all the possible values, to further reduce the number of bits required to indicate these two values. In one example, four bits are used for $n_1$, and four bits are used for $N_3$; candidate values for $n_1$ are 0, α, 2α, . . . , 15α; and candidate values for $N_3$ are 1, 2, 4, 8, 16, 32, 64, and 128. The number of bits for QCL indication in the DCI signaling is determined according to the indicated $N_3$ value, ceiling(log 2($N_3$)), i.e., 0, 1, 2, 3, 4, 5, 6, 7. Note that the numbers used in this example are just for illustration, and other examples can be similarly constructed without departing from the principles of the current embodiment.

The PHY signaling, e.g., the UL related DCI may also convey information on which set of CSI-RS for a UE to measure and report in the scheduled PUSCH.

In one example, the information indicates the UE to report CSI/BSI on either the first set of CSI-RS resources (or alternatively SS blocks) or the second set of CSI-RS resources.

In another example, the information indicates the UE to measure report CSI/BSI on one of the following three types of resources: (1) SS blocks; (2) the first set of CSI-RS resources; and (3) the second set of CSI-RS resources. As the number of resources for these three different types of resources is different, the number of bits to be used for the indication of the identity and QCL of the resources may also be correspondingly determined.

In some embodiments, the RRC signaling to configure a UE-specific resource setting configures multiple resource sets in the resource setting. The time-frequency resource may be commonly configured for the multiple resource sets, but the indicated reference unit resources may be different for the different resource sets. The resource sets in the UE-specific resource setting may be semi-dynamically activated/deactivated. In the UL related DCI to trigger an aperiodic CSI reporting, one resource set selected from the activated resource sets in each resource setting is indicated, so that the UE can make measurement and reporting for the selected resource set. The information bit size to indicate the selected resource set may be semi-dynamically determined according to the number of activated resource sets in each resource setting.

In some embodiments, the aperiodic reporting related information in UL related DCI may indicate the identities of the reference unit resources without any compression.

In some embodiments, the reference unit resources may be selected from a subset of unit resources in a reference resource setting. The subset selection signaling may correspond to resource activation/deactivation signaling in an MAC CE. The number of bits to indicate the reference unit resource ID is determined according to the number of activated unit resources in the indicated subset in the reference resource setting.

In some embodiments, the association between the reference unit resources and the set of unit resources in each resource set of a UE-specifically configured resource setting is semi-statically made by RRC signaling. The DCI signaling indicates the set ID in the setting ID, and the QCL relation is inferred by the semi-static association.

Figure 13:
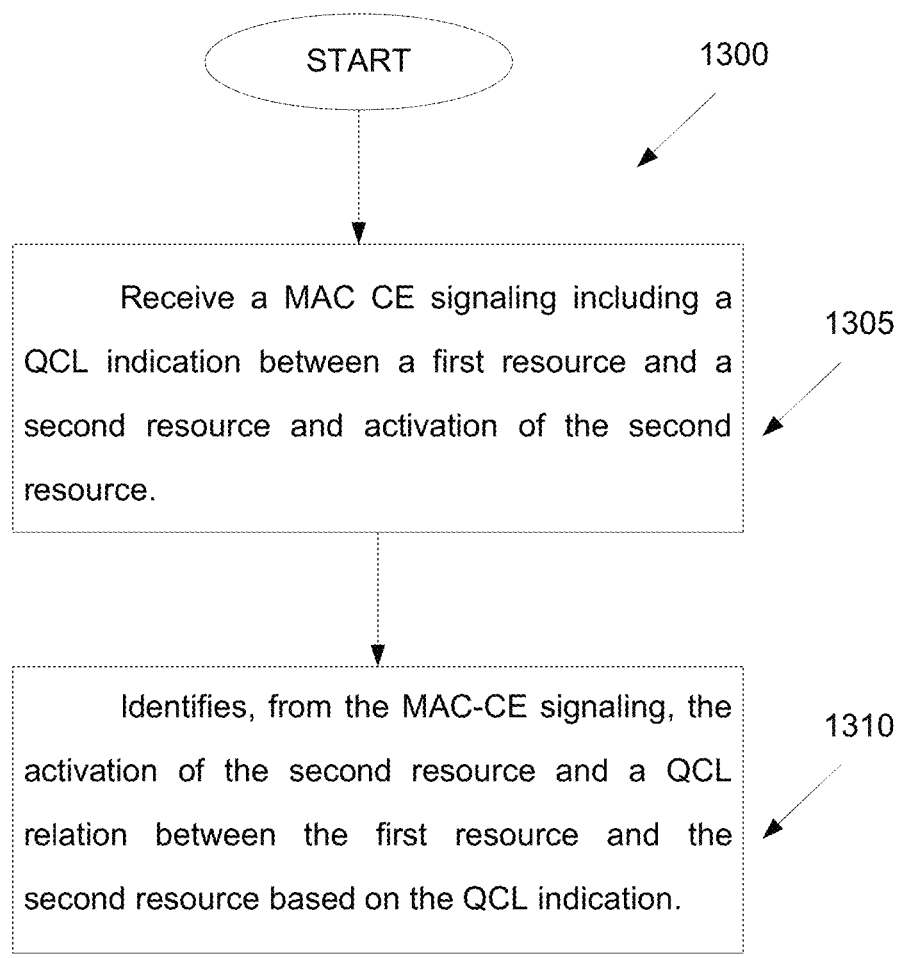
FIG. 13 illustrates a flow chart of a method according to embodiments of the present disclosure.

FIG. 13 illustrates a flow chart of a method 1300, may be performed by a user equipment (UE), according to embodiments of the present disclosure. The embodiment of the method 1300 illustrated in FIG. 13 is for illustration only. FIG. 13 does not limit the scope of this disclosure to any particular implementation.

As shown in FIG. 13, the method 1300 begins at step 1305. In step 1305, the UE receives, from a base station (BS), a medium access control (MAC) control element (CE) signaling including a quasi co-location (QCL) indication between a first resource and a second resource and activation of the second resource, wherein the UE is configured with the second resource for CSI reporting. In step 1305, the first resource is a synchronization signal (SS) block.

In step 1305, the first resource is a first CSI reference signal (RS) resource and the second resource is a second CSI-RS resource. In step 1305, a set of resources comprising the second resource includes a plurality of resource identifiers (IDs), and the MAC-CE signaling further includes an indication of a selected subset of the plurality of resource IDs. The subset selection in step 1305 indicates which of resources of the set of resources are QCLed with resources of the second resource.

In some embodiments, the UE in step 1305 receives, from the BS, information on a set of resources comprising the second resource. In such step 1305, the QCL indication comprises a QCL parameter for the first resource. In such embodiments, the QCL parameter is a spatial parameter related to an Rx beam for the first and the second resource.

In step 1310, the UE identifies, from the MAC-CE signaling, the activation of the second resource and a QCL relation between the first resource and the second resource based on the QCL indication.

In some embodiments, the UE in step 1310 identifies the second resource to use as a QCL reference for the first resource.

Figure 14:
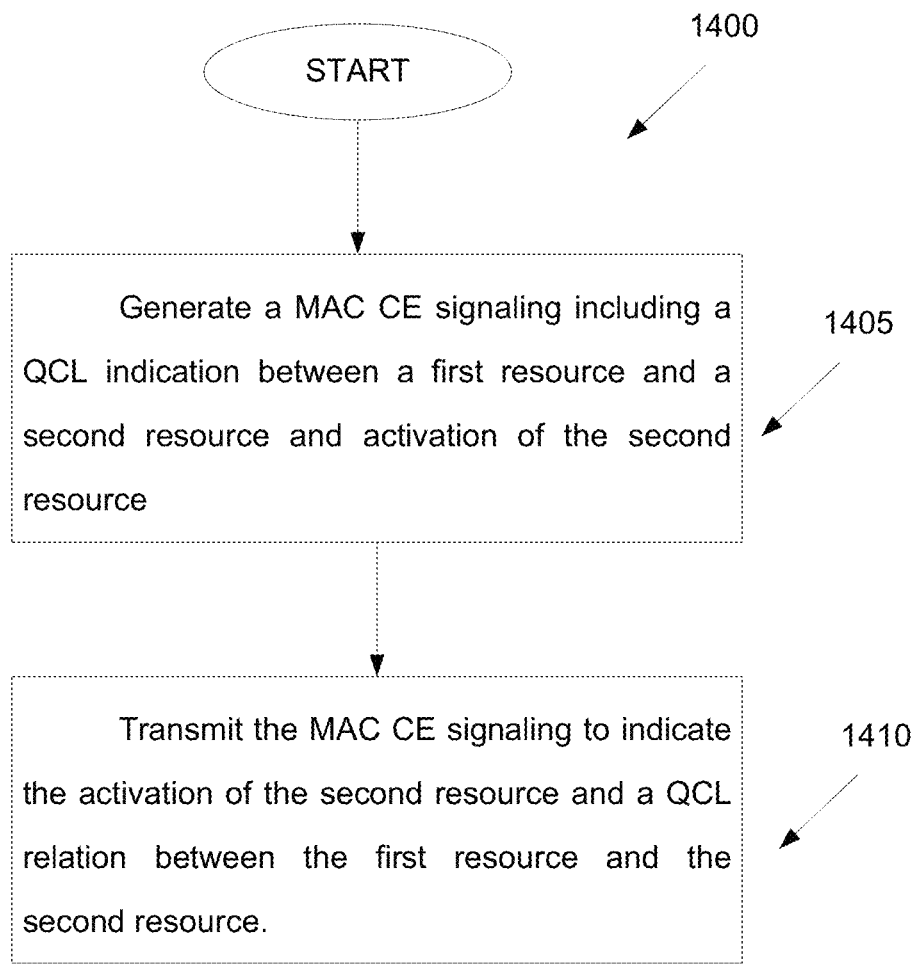
FIG. 14 illustrates another flow chart of a method according to embodiments of the present disclosure.

FIG. 14 illustrates a flow chart of a method 1400, may be performed by a base station (BS), according to embodiments of the present disclosure. The embodiment of the method 1400 illustrated in FIG. 14 is for illustration only. FIG. 14 does not limit the scope of this disclosure to any particular implementation.

As shown in FIG. 14, the method 1400 begins at step 1405. In step 1405, the BS generates a medium access control (MAC) control element (CE) signaling including a quasi co-location (QCL) indication between a first resource and a second resource and activation of the second resource. In step 1405, the first resource is a synchronization signal (SS) block.

In step 1405, the first resource is a first CSI reference signal (RS) resource and the second resource is a second CSI-RS resource. In step 1405, a set of resources comprising the second resource includes a plurality of resource identifiers (IDs), and the MAC-CE signaling further includes an indication of a selected subset of the plurality of resource IDs. The subset selection indicates which of resources of the set of resources are QCLed with resources of the second resource.

In step 1410, the BS transmits, to a user equipment (UE), the MAC-CE signaling to indicate the activation of the second resource and a QCL relation between the first resource and the second resource.

In some embodiments, the BS transmits, to the UE, information on a set of resources comprising the second resource, and the QCL indication comprises a QCL parameter for the first resource. In such embodiments, the QCL parameter is a spatial parameter related to an Rx beam for the first and the second resource.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) in a wireless communication system, the UE comprising:
 a transceiver; and
 at least one processor coupled to the transceiver and configured to:
  receive, from a base station (BS), configuration information including one or more sets of channel state information-reference signal (CSI-RS) resources for channel state information (CSI) reporting via radio resource control (RRC) signaling, and receive, from the BS, a medium access control (MAC) control element (CE) for an activation or a deactivation of a set of CSI-RS resources, the MAC CE including:
an index of the set of CSI-RS resources among the one or more sets of CSI-RS resources, and
a quasi co-location (QCL) indication between a reference resource and a CSI-RS resource in the set of CSI-RS resources.

2. The UE of claim 1, wherein the reference resource is a CSI-RS resource or a synchronization signal (SS) block.

3. The UE of claim 1, wherein the at least one processor is further configured to:
identify the reference resource to use as a QCL reference for the CSI-RS resource with a set of QCL parameters including a spatial parameter related to a receive (Rx) beam.

4. The UE of claim 1,
wherein a serving set of CSI-RS resources including the reference resource is configured via RRC signaling and includes one or more resource identifiers (IDs) that are individually configured for one or more resources in the serving set of CSI-RS resources, and
wherein one or more QCL reference resources for the set of CSI-RS resources are indicated in the MAC-CE by a selected subset of the one or more resource IDs.

5. The UE of claim 4, wherein the at least one processor is further configured to:
receive a MAC CE signaling for indicating an active subset of the serving set of CSI-RS resources, and
receive downlink control information (DCI) for indicating one of CSI-RS resources of the active subset using N-bits, the DCI used to trigger an aperiodic CSI, and
wherein a number of CSI-RS resources of the active subset is associated with $2^N$.

6. A base station (BS) in a wireless communication system, the BS comprising:
a transceiver; and
at least one processor coupled to the transceiver, and configured to:
transmit, to a user equipment (UE), configuration information including one or more sets of channel state information-reference signal (CSI-RS) resources for channel state information (CSI) reporting via radio resource control (RRC) signaling, and
transmit, to the UE, a medium access control (MAC) control element (CE) for an activation or a deactivation of a set of CSI-RS resources, the MAC CE including:
an index of the set of CSI-RS resources among the one or more sets of CSI-RS resources, and
a quasi co-location (QCL) indication between a reference resource and a CSI-RS resource in the set of CSI-RS resource.

7. The BS of claim 6, wherein the reference resource is a CSI-RS resource or a synchronization signal (SS) block.

8. The BS of claim 6, wherein the at least one processor is further configured to transmit, to the UE, information for identifying the reference resource to use as a QCL reference for the CSI-RS resource with a set of QCL parameters including a spatial parameter related to a receive (Rx) beam.

9. The BS of claim 6,
wherein a serving set of CSI-RS resources including the reference resource is configured via radio resource control (RRC) signaling and includes one or more resource identifiers (IDs) that are individually configured for one or more resources in the serving set of CSI-RS resources, and
wherein one or more QCL reference resources for the set of CSI-RS resources are indicated in the MAC-CE signaling by a selected subset of the one or more resource IDs.

10. The BS of claim 9, wherein the at least one processor is further configured to
transmit a MAC CE signaling for indicating an active subset of the serving set of CSI-RS resources, and
transmit downlink control information (DCI) for indicating one of CSI-RS resources of the active subset using N-bits, the DCI used to trigger an aperiodic CSI, and
wherein a number of CSI-RS resources of the active subset is associated with $2^N$.

11. A method performed by a user equipment (UE) in a wireless communication system, the method comprising:
receiving, from a base station (BS), configuration information including one or more sets of channel state information-reference signal (CSI-RS) resources for channel state information (CSI) reporting via radio resource control (RRC) signaling; and
receiving, from the BS, a medium access control (MAC) control element (CE) for an activation or a deactivation of a set of CSI-RS resources, the MAC CE including:
an index of the set of CSI-RS resources among the one or more sets of CSI-RS resources, and
a quasi co-location (QCL) indication between a reference resource and a CSI-RS resource in the set of CSI-RS resources.

12. The method of claim 11, wherein the reference resource is a CSI-RS resource or a synchronization signal (SS) block.

13. The method of claim 11, further comprising:
identifying the reference resource to use as a QCL reference for the CSI-RS resource with a set of QCL parameters including a spatial parameter related to a receive (Rx) beam.

14. The method of claim 11,
wherein a serving set of CSI-RS resources including the reference resource is configured via RRC signaling and includes one or more resource identifiers (IDs) that are individually configured for one or more resources in the serving set of CSI-RS resources, and
wherein one or more QCL reference resources for the set of CSI-RS resources are indicated in the MAC-CE by a selected subset of the one or more resource IDs.

15. The method of claim 14, further comprising:
receiving a MAC CE signaling for indicating an active subset of the serving set of CSI-RS resources; and
receiving downlink control information (DCI) for indicating one of CSI-RS resources of the active subset using N-bit, the DCI used to trigger an aperiodic CSI,
wherein a number of CSI-RS resources of the active subset is associated with 2N.

16. A method performed by a base station (BS) in a wireless communication system, the method comprising:
transmitting, to a user equipment (UE), configuration information including one or more sets of channel state information-reference signal (CSI-RS) resources for channel state information (CSI) reporting via radio resource control (RRC) signaling; and
transmitting, to the UE, a medium access control (MAC) control element (CE) for an activation or a deactivation of a set of CSI-RS resources, the MAC CE including:

an index of the set of CSI-RS resources among the one or more sets of CSI-RS resources, and a quasi co-location (QCL) indication between a reference resource and a CSI-RS resource in the set of CSI-RS resource.

17. The method of claim 16, wherein the reference resource is a CSI-RS resource or a synchronization signal (SS) block.

18. The method of claim 16, further comprising:
transmitting, to the UE, information for identifying the reference resource to use as a QCL reference for the CSI-RS resource with a set of QCL parameters including a spatial parameter related to a receive (Rx) beam.

19. The method of claim 16,
wherein a serving set of CSI-RS resources including the reference resource is configured via radio resource control (RRC) signaling and includes one or more resource identifiers (IDs) that are individually configured for one or more resources in the serving set of CSI-RS resources, and wherein one or more QCL reference resources for the serving set of CSI-RS resources are indicated in the MAC-CE signaling by a selected subset of the one or more resource IDs.

20. The method of claim 19, further comprising:
transmitting a MAC CE signaling for indicating an active subset of the serving set of CSI-RS resources; and
transmitting downlink control information (DCI) for indicating one of CSI-RS resources of the active subset using N-bit, the DCI used to trigger an aperiodic CSI, wherein a number of CSI-RS resources of the active subset is associated with 2N.

* * * * *